United States Patent
Jung et al.

(10) Patent No.: US 10,762,707 B2
(45) Date of Patent: Sep. 1, 2020

(54) POINT CLOUD RAIL ASSET DATA EXTRACTION

(71) Applicant: THALES CANADA, INC., Toronto, Ontario (CA)

(72) Inventors: Jaewook Jung, Toronto (CA); Gunho Sohn, Toronto (CA); Michael Rickard, Toronto (CA); Alon Green, Toronto (CA); Walter Kinio, Toronto (CA)

(73) Assignee: THALES CANADA, INC., Toronto (CA)

(*) Notice: Subject to any disclaimer, the term of this patent is extended or adjusted under 35 U.S.C. 154(b) by 0 days.

(21) Appl. No.: 16/193,603

(22) Filed: Nov. 16, 2018

(65) Prior Publication Data

US 2019/0156569 A1 May 23, 2019

Related U.S. Application Data

(60) Provisional application No. 62/587,760, filed on Nov. 17, 2017.

(51) Int. Cl.
*G06T 19/00* (2011.01)
*G06K 9/00* (2006.01)
(Continued)

(52) U.S. Cl.
CPC ............ *G06T 19/00* (2013.01); *G06K 9/00* (2013.01); *G06K 9/00651* (2013.01); *G06T 7/12* (2017.01);
(Continued)

(58) Field of Classification Search
CPC .................... G06T 17/00–30; G06T 7/277
See application file for complete search history.

(56) References Cited

U.S. PATENT DOCUMENTS 7,472,084 B2   12/2008   Damschroder
8,244,026 B2    8/2012   Nahari et al.
(Continued)

FOREIGN PATENT DOCUMENTS

CN    107796304        3/2018
KR    20160121452 A   10/2016

OTHER PUBLICATIONS

Arastounia, Mostafa, and Sander Oude Elberink. "Application of template matching for improving classification of urban railroad point clouds." Sensors 16.12 (2016): 2112. (Year: 2016).*

(Continued)

*Primary Examiner* — Daniel F Hajnik
(74) *Attorney, Agent, or Firm* — Hauptman Ham, LLP (57) ABSTRACT

A method includes detecting an initialization position of a processing zone within a graphical user interface, the processing zone having boundaries and a predefined direction extending away from the initialization position, the graphical user interface comprising displayed point cloud data, the displayed point cloud data being based on a scanning of a three dimensional space. The method also includes applying a Kalman filter to the track points to identify a trajectory of a guideway and generating a model of the guideway based on the track points and the trajectory. The method further includes detecting one or more of a turnout region or an object associated with the guideway. The method additionally includes generating a map comprising the model of the guideway and one or more of the turnout region or the object, and at least one label identifying the turnout region or the object included in the map.

20 Claims, 8 Drawing Sheets

(51) Int. Cl.
    *G06T 7/12*     (2017.01)
    *G06T 7/277*     (2017.01)
    *G06T 7/143*     (2017.01)

(52) U.S. Cl.
    CPC .............. *G06T 7/143* (2017.01); *G06T 7/277* (2017.01); *G06T 2207/10028* (2013.01); *G06T 2207/30184* (2013.01); *G06T 2207/30241* (2013.01); *G06T 2210/56* (2013.01); *G06T 2219/004* (2013.01)

(56) References Cited

U.S. PATENT DOCUMENTS

| | | | |
|---|---|---|---|
| 8,542,252 | B2 | 9/2013 | Perez et al. |
| 9,188,439 | B2 | 11/2015 | Seifert et al. |
| 9,285,230 | B1 | 3/2016 | Silver et al. |
| 9,383,753 | B1 | 7/2016 | Templeton et al. |
| 9,569,565 | B2 | 2/2017 | Devito et al. |
| 9,764,746 | B2 | 9/2017 | Bhattacharjya et al. |
| 9,796,400 | B2 | 10/2017 | Puttagunta et al. |
| 2005/0192720 | A1* | 9/2005 | Christie ............... B61L 25/025 701/19 |
| 2013/0335528 | A1 | 12/2013 | Vishwanath et al. |
| 2016/0221592 | A1 | 8/2016 | Puttagunta et al. |
| 2016/0233225 | A1 | 8/2016 | Lokitz et al. |
| 2016/0249040 | A1 | 8/2016 | Mesher |
| 2017/0016870 | A1 | 1/2017 | McPeek |
| 2017/0066459 | A1 | 3/2017 | Singh |
| 2017/0286911 | A1* | 10/2017 | Randle, II ............... H04L 67/22 |

OTHER PUBLICATIONS

NPL Video Titled "Script in 3DReshaper: automatic rail extraction from point clouds", available for viewing at: https://www.youtube.com/watch?v=o80RfNKOLrY; published Sep. 17, 2014; select screenshots included. (Year: 2014).*

Beger, Reinhard, et al. "Data fusion of extremely high resolution aerial imagery and LiDAR data for automated railroad centre line reconstruction." ISPRS Journal of Photogrammetry and Remote Sensing; 66.6 (2011): S40-S51. (Year: 2011).*

Sonh et al., "Kalman filter based railway tracking from mobile Lidar data", ISPRS Annals of the Photogrammetry, Remote Sensing and Spatial Information Sciences, vol. II-3/W5, 2015, ISPRS Geospatial Week 2015, Sep. 28-Oct. 3, 2015, pp. 159-164, La Grande Matte, France.

Arastounia M, "Automatic classification of Lidar point clouds in a railway environment", Master Thesis, Faculty of Geo-Information Science and Earth Observation, pp. 1-83, University of Twente, Netherlands, Mar. 2012.

Elberink et al., "Automatic extraction of railroad centerlines from mobile laser scanning data", Remote Sensing, vol. 7, p. 5565-5583, 2015.

Neubert et al., "Extraction of railroad objects from very high resolution helicopter-borne Lidar and ortho-image data", pp. 1-6, Aug. 2008.

International Search Report and the Written Opinion issued in corresponding International Application No. PCT/IB2018/059071, dated Feb. 19, 2019, pp. 1-9, Canadian Intellectual Property Office, Quebec, Canada.

Wang, Teng et al., "A Dynamic Model for Quantifying Rail-Highway Grade Crossing Roughness", Article in Journal of Transportation Safety & Security, Nov. 2015, 30 pages, ResearchGate, https://www.tandfonline.com/doi/abs/10.1080/19439962.2015.1048016.

Chen, Jingdao et al., "Principal Axes Descriptor for Automated Construction-Equipment Classification from Point Clouds", Article in Journal of Computing in Civil Engineering, Sep. 2016, 18 pages, ResearchGate, https://ascelibrary.org/doi/abs/10.1061(ASCE)CP.1943-5487.0000628.

Cai, Hubo, et al., "Modeling Road Centerlines and Predicting Lengths in 3-D Using LIDAR Point Cloud Data and Planimetric Road Centerline Data", Feb. 12, 2008, 23 pages, https://onlinelibrary.wiley.com/doi/full/10.1111/i.1467-8667.2008.00518.x.

Yazhemsky, Dennis, et al., "A Convex Real-time Capable On-line Optimal Controller for a Commuter Train", IEEE Feb. 5, 2017, pp. 1-11.

Rashid, Muzamil, "Optimal Control of a Commuter Train with Traction and Braking Time Delays", IEEE Transactions on Intelligent Transportation Systems, vol. XX, No. XX, Sep. 2017, pp. 1-12.

\* cited by examiner

POINT CLOUD RAIL ASSET DATA EXTRACTION

PRIORITY CLAIM

The present application claims the priority benefit of U.S. Provisional Patent Application No. 62/587,760 filed Nov. 17, 2017, the entirety of which is hereby incorporated by reference.

BACKGROUND

LIDAR (Light Detection and Ranging) surveys are sometimes used to gather data usable for identifying and mapping objects in a three dimensional space. Data gathered by way of a LIDAR scan is often referred to as point cloud data. LIDAR scanning has significantly reduced the time it takes to gather data regarding a three dimensional space. Nonetheless, identifying and mapping objects such as a guideway, railway or objects associated with the guideway or railway is a time consuming manual effort that involves extracting the guideway or railway, and/or associated objects, locations of the objects, and attributes thereof from the point cloud data.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus, object in use or operation, or objects scanned in a three dimensional space, in addition to the orientation thereof depicted in the figures. The apparatus may be otherwise oriented (rotated 90 degrees or at other orientations) and the spatially relative descriptors used herein may likewise be interpreted accordingly.

According to various embodiments, the terms guideway and railway are used interchangeably for simplicity and ease of discussion. In some embodiments, a guideway is a track, rail, roadway, cable, series of reflectors, series of signs, a visible or invisible path, a projected path, a laser-guided path, a global positioning system (GPS)-directed path, an object-studded path or other suitable format of guide, path, track, road or the like on which, over which, below which, beside which, or along which a vehicle is caused to travel.

While LIDAR surveys have significantly reduced the time spent on railways to gather data usable for mapping the railways, it still takes considerable time and manual effort to extract railway assets, locations, and attributes thereof in a point cloud generated by a LIDAR scanning of a three dimensional space. It currently takes days for each hour of scanning to have a user identify railway assets, identify and extract railway center lines, identify objects, and then markup and layer each railway asset using CAD (Computer Aided Drafting) and/or other software tools to gather all of the guideway assets that are often included in a survey. Although some software tools are usable for recognizing railway tracks and drawing a center line down the tracks so that other railway assets can be measured, these tools are dependent on significant human-computer interaction to modify CAD lines when the software "loses" the rail (for example, is unable to accurately identify the location of a rail from the data), are not fully automated, do not process switch areas, and/or fail to continue to process new track sections upon a switch area being identified by a user.

Figure 1:
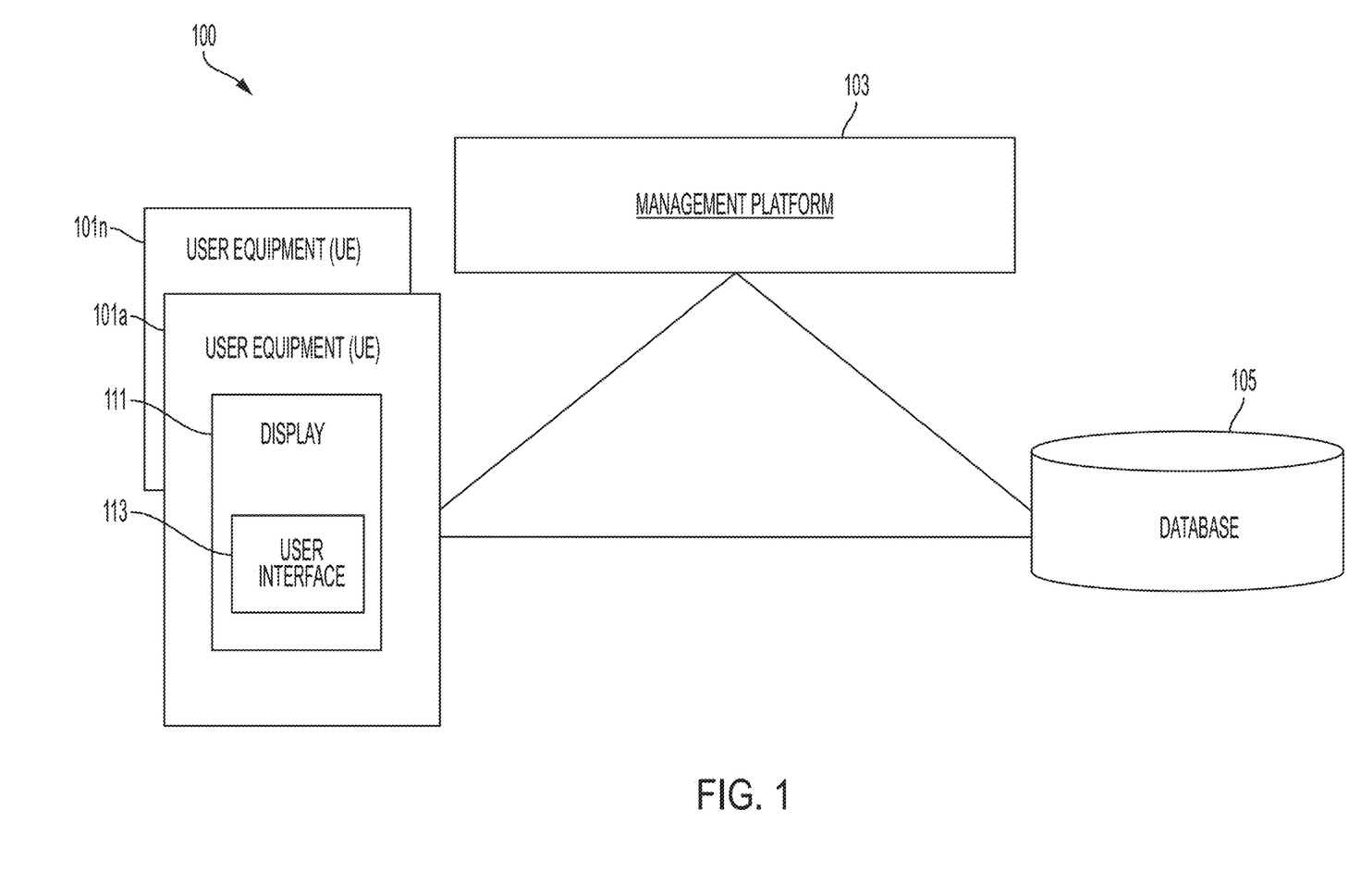
FIG. 1 is a diagram of a system for extracting guideway assets from point cloud data and generating a map of the guideway and various objects associated with the guideway, in accordance with one or more embodiments.

FIG. 1 is a diagram of a system 100, in accordance with one or more embodiments. In some embodiments, the system 100 makes it possible to automatically recognize railway assets such as rail tracks, guideway, or physical objects associated with the guideway, or other suitable objects by processing LIDAR survey point cloud files. In some embodiments, system 100 is configured to generate an engineering-grade survey from the LIDAR survey point cloud files that includes one or more of a map of a guideway, one or more objects associated with the guideway, and position data usable to identify a geographical location of the guideway or the one or more objects, a location of the guideway or the one or more objects with respect to one another, a location of the guideway or the one or more objects with respect to a reference position, a location with respect to the guideway, or a location of the guideway or the one or more objects with respect to a reference plane. In some embodiments, an engineering-grade survey is a survey of a three dimensional space that includes locations of landmarks, objects and/or assets with an accuracy that is in accordance with a predefined limit associated with a purpose of the intended application of the generated survey data. In some embodiments, the generated engineer-grade survey yields locations of landmarks/objects/assets with an accuracy of +/− 10 cm. In some embodiments, the generated engineer-grade survey yields locations of landmarks/objects/assets with an accuracy of +/− 5 cm. In some embodiments, the generated engineer-grade survey yields locations of landmarks/objects/assets with an accuracy of +/− 15 cm. In some embodiments, the generated engineer-grade survey yields locations of landmarks/objects/assets with an accuracy of +/− some other suitable allowable deviation.

As shown in FIG. 1, the system 100 comprises user equipment (UE) 101a-101n (collectively referred to herein as "UE 101") having connectivity to a management platform 103 and a database 105.

The UE 101, the management platform 103 and the database 105 are modular components of a special purpose computer system. In some embodiments, one or more of the UE 101, the management platform 103, and the database 105 are unitarily embodied in the UE 101. The UE 101, accordingly, comprises a processor by which the management platform 103 is executed. In some embodiments, one or more of the UE 101, the management platform 103 and/or the database 105 are configured to be located remotely from each other. By way of example, the UE 101, the management platform 103 and/or the database 105 communicate by wired or wireless communication connection and/or one or more networks, or combination thereof.

The UE 101 is a type of mobile terminal, fixed terminal, or portable terminal including a desktop computer, laptop computer, notebook computer, tablet computer, wearable circuitry, mobile handset, server, gaming console, or combination thereof. The UE 101 comprises a display 111 by which a user interface 113 is displayed. In some embodiments, the user interface 113 additionally or alternatively comprises an audio interface or an interface that interacts with a user via a haptic response.

Management platform 103 is a set of computer readable instructions that, when executed by a processor such as a processor 703 (FIG. 7), facilitates the connectivity between the UE 101 and database 105. In some embodiments, the management platform 103 causes information that describes one or more of the UE 101, interactions with user interface 113, or other suitable information to be stored in the database 105. In some embodiments, management platform 103 is implemented by a computer remote from UE 101. In some embodiments, management platform 103 is implemented by one or more UE 101's. In some embodiments, a portion of management platform 103 is implemented by at least one UE 101 and by one or more other UE 101's and/or one or more other computers remote from UE 101.

In some embodiments, one or more of management platform 103 or user interface 113 is associated with a plugin that is installed locally on UE 101. In some embodiments, user interface 113 is generated, or at least is caused to output information associated with generating a guideway map, guideway topology report, or other suitable output based on a processing by management platform 103 that is one or more of performed locally on UE 101 or remotely from UE 101.

Database 105 is stored in a memory such as a memory 705 (FIG. 7) capable of being queried or caused to store data associated with the UE 101, management platform 103, and/or a user interaction with the user interface 113.

Management platform 103 is configured to cause point cloud data generated based on a scanning of a three dimensional space to be displayed by way of graphical user interface 113. In some embodiments, the point cloud data is generated by a LIDAR scanning of the three dimensional space. In some embodiments, management platform 103 is configured to perform a real-time analysis of point cloud files. In some embodiments, the point cloud data is included in files that are .las files, .pts files, or files having some other suitable format or file extension.

In some embodiments, management platform 103 is configured to prompt a user to set an initialization position within the displayed point cloud data to start recognizing a guideway within the point cloud data. In some embodiments, management platform 103 is configured to place a processing zone having boundaries at or near the initialization position set by the user. In some embodiments, management platform 103 prompts a user to place a processing zone having boundaries within the displayed point cloud data and the placement of the processing zone designates the initialization position. In some embodiments, the initialization position is on a boundary of a placed processing zone. In some embodiments, the initialization position is within the boundaries of the processing zone. In some embodiments, the initialization position is a point selected by way of a user input and the point selected by way of the user input prompts one or more of a beginning of the processing of the point cloud data or the placement of a processing zone within the displayed point cloud data. In some embodiments, management platform 103 is configured to automatically establish an initialization position based on the displaying of the point cloud data and set a processing zone at or encompassing the initialization position. In some embodiments, automatically establishing the initialization position is based on a pre-established default position in a display of point cloud data and a calculation to determine the likelihood that a plurality of point cloud data points included in the processing zone as associated with a guideway based on a comparison with at least one guideway template stored in memory 105. If the comparison results in a likelihood over a predefined threshold, the management platform 103 defines the points within the processing zone as track points. If the comparison results in a likelihood below the predefined threshold, the management platform 103 establishes a different initialization position in the display of point cloud data that is other than the pre-established default position, sets new processing zone based on the different initialization position, calculates the likelihood that the plurality of point cloud data points included in the processing zone as associated with a guideway based on a comparison with at least one guideway template stored in memory 105, and continues to do so until the comparison results in a likelihood over a predefined threshold, and defines the points within the processing zone as track points.

Management platform 103 detects the initialization position of a processing zone within the displayed point cloud data and identifies a plurality of points within the processing zone as track points. In some embodiments, the processing zone has a predefined direction extending away from the initialization position. In some embodiments, the predefined direction of the processing zone is a basis upon which an orientation of the processing zone within the displayed point cloud data is established with respect to the initialization position or some other reference position or reference plane. In some embodiments, the processing zone is rectangular, cuboid, square, cubic, circular, spherical, elliptical, trapezoidal, triangular, pyramidal, or some other suitable shape. In some embodiments, the predefined direction of the processing zone is associated with, along, parallel to, tangential to, or perpendicular to, a length direction, diametrical direction, radial direction, width direction, or other suitable direction correspond to the shape of the processing zone. In some embodiments, the size and shape of the processing zone is selectable based on a user input. In some embodiments, the size and shape of the processing zone is pre-established based on a default setting in management platform 103.

In some embodiments, management platform 103 is configured to generate a rough model of a guideway in the three dimensional space based on the track points and apply a Kalman filter to the rough model of the guideway to identify a trajectory of consecutive guideway portions included in the guideway. Management platform 103 is configured to detect a turnout region in the model of the guideway based on one or more of the track points, the rough model of the guideway or the trajectory of the consecutive guideway portions with one or more turn out templates stored in database 105.

In some embodiments, management platform 103 is configured to generate an updated model of the guideway by revising the rough model of the guideway based on the trajectory of the consecutive guideway portions and the turnout region. In some embodiments, management platform 103 is configured to detect an object associated with the guideway based on a comparison of the point cloud data with one or more object templates stored in database 105. The one or more object templates stored in database 105 are each representative of one or more shapes associated with one or more known objects. In some embodiments, the object templates are representative of one or more of platform bounds, signals, switch areas, signs, tunnels, trees, toes, rail types, tongues, or other suitable railway assets or objects. In some embodiments, a determination that the point cloud data is associated with a known object or a guideway is based on a matching between the point cloud data and the templates stored in the database 105 as being within a predefined percentage indicative of a likelihood that the point cloud data is associated with one or more known objects or a guideway in the three dimensional space. In some embodiments, if the comparison results in a percentage match that is greater than 50%, then management platform 103 determines the point cloud data is associated with a matching object or guideway. In some embodiments, management platform 103 is configured to determine whether the point cloud data is associated with an object or a guideway based on some other suitable percentage match. In some embodiments, if the comparison results in a percentage match that is greater than 90%, then management platform 103 determines the point cloud data is associated with a matching object or guideway. In some embodiments, management platform 103 is configured to determine whether the point cloud data is associated with an object or a guideway based on some other suitable percentage match that is specific to a template, a known object-type, or guideway. In some embodiments, for one type of object, if the comparison results in a percentage match that is greater than 50%, then management platform 103 determines the point cloud data is associated with a matching object or guideway and for another type of object, if the comparison results in a percentage match that is greater than 90%, then management platform 103 determines the point cloud data is associated with a matching object or guideway.

Management platform 103 is configured to generate a map comprising the updated model of the guideway and one or more of the turnout region or the object, and at least one label identifying the turnout region or the object included in the map.

In some embodiments, after management platform 103 recognizes a guideway in the point cloud data, management platform 103 processes the identified guideway and "draws" (i.e., establishes or determines and subsequently displays) a center line down the guideway. In some embodiments, the guideway is a monorail, a dual rail track, a three rail track, or some other suitable quantity of rails or guides along which, on which, over which, below which or beside which a vehicle is capable of traveling. While processing the identified guideway, the management platform 103 continues along the guideway in a direction away from the initialization position. In some embodiments, a plurality of processing zones are positioned along an estimated guideway. In some embodiments, management platform 103 generates a plurality of processing zones that are positioned along an estimated path of the recognized guideway. In some embodiments, management platform 103 automatically generates a new processing zone at an end of an initial processing zone based on a determination that a guideway exists within the initial processing zone such that the guideway is recognized based on a serial processing of a plurality of processing zones, and each processing zone becomes an initial processing zone upon recognition of a guideway portion therein.

When the management platform 103 determines that a switch exists in the guideway, management platform 103 continues to process the guideway by proceeding along the right branch of the switch and a new initialization position is set on the left branch to be automatically processed later. In some embodiments, management platform 103 continues to process the guideway by proceeding along the left branch of the switch and a new initialization position is set on the right branch to be automatically processed later. In some embodiments, management platform 103 is configured to process each branch of the switch simultaneously. In some embodiments, when the management platform 103 determines that a switch exists in the guideway, management platform 103 continues to process the guideway by proceeding along one of the right branch of the switch or the left branch of the switch, and sets a new initialization position on the other of the left branch or the right branch to be automatically processed in parallel with the processing of the right branch of the switch or the left branch of the switch.

In some embodiments, management platform 103 is configured to initiate a user approval process to validate the recognized guideway. In some embodiments, upon receiving a user validation of the guideway, management platform 103 processes the point cloud data to identify additional railway assets or objects associated with the guideway. In some embodiments, management platform 103 processes the point cloud data to identify one or more of a type of railway asset or object or a location of the railway asset or object. In some embodiments, the location of the railway asset or object is a geographical position, an identification of with which track the railway asset or object is associated, an indication of how far along the track the railway asset or object is located with respect to a reference position, an indication of how far the railway asset or object is located from the centerline, or some other suitable positional information. In some embodiments, management platform 103 is configured to cause information describing the railway asset or object type, position, or other information associated with the railway asset or object to be stored in database 105.

In some embodiments, management platform 103 is configured to generate a guideway topology report comprising edges and nodes with measurements and connections. In some embodiments, management platform 103 is configured to generate computer aided design (CAD) files with rails, centerline(s), and railway assets or objects all on separate layers for easy viewing by way of user interface 113. In some embodiments, management platform 103 is configured to generate a text export file that lists all railway assets, objects, centerlines, rails, or other suitable information for each track, in order as per the measurements along the track. In some embodiments, one or more outputs generated by management platform 103 are usable for urban or mainline railway surveys.

In some embodiments, management platform 103 is configured to build the map of the guideway and/or generate the guideway topology to facilitate extraction of additional railway assets and identify corresponding unique track and chainage (measurement along a track) along with additional parameters such as side of track, facing direction, height, or other suitable descriptors in a manner that is automated and integrated into the railway survey process to collect attributes for recognizing the railway design.

In some embodiments, management platform 103 automatically recognizes railway assets or objects such as platform bounds, signals, switch areas, signs, tunnels automatically, or other suitable railway assets or objects.

In some embodiments, system 100 is configured to automate railway and object recognition in the LIDAR survey process, which makes the procedure appreciably faster compared to conventional methods of using tape measures and survey wheels that are prone to human error and are often inaccurate or unrepeatable. Automatic data extraction from the point cloud data is a significant step in applying a LIDAR survey to railway mapping and object recognition.

Figure 2:
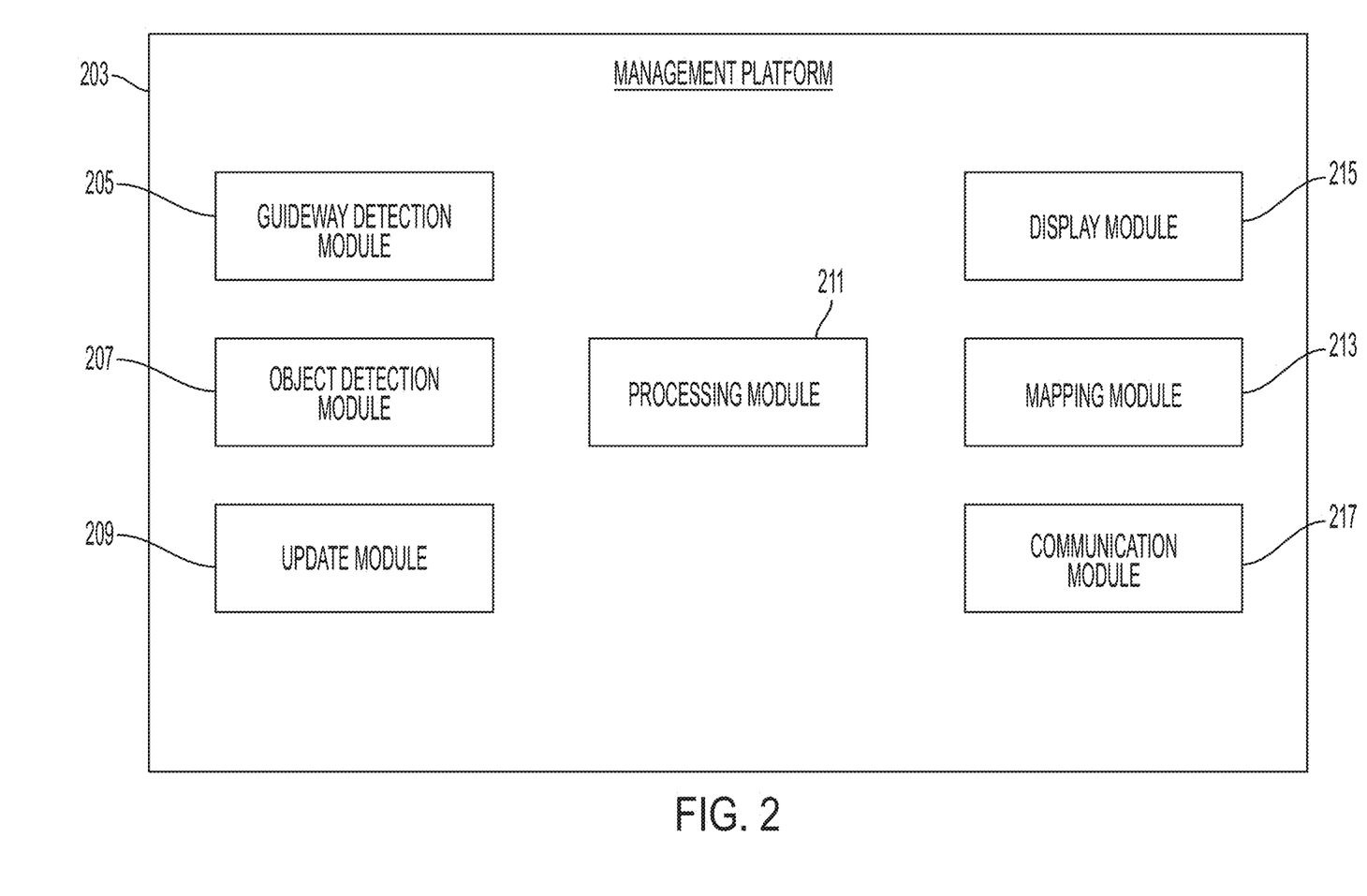
FIG. 2 is a diagram of a management platform, in accordance with one or more embodiments.

FIG. 2 is a diagram of a management platform 203, in accordance with one or more embodiments. In some embodiments, management platform 203 is usable as management platform 103 (FIG. 1). Management platform 203 comprises a guideway detection module 205, an object detection module 207, an update module 209, a processing module 211, a mapping module 213, a display module 215 and a communication module 217. In some embodiments, one or more of the layers or modules included in management platform 203 is at least partially implemented by one or more of a computer remote from UE 101 or another UE 101. In some embodiments, management platform 203 is entirely implemented by a processor remote from UE 101. In some embodiments, management platform 203 is entirely implemented by UE 101.

In some embodiments, processing module 211 causes point cloud data received by way of communication module 217 to be processed such that guideway detection module 205 and object detection module 207 are caused to detect one or more guideway portions or one or more objects associated with the guideway based on the processing of the point cloud data. In some embodiments, one or more of guideway detection module 205 or object detection module 207 comprises one or more algorithms that when applied to the point cloud data, are usable for identifying the one or more guideway portions or the one or more objects associated with the guideway. Update module 209 is configured to cause one or more of the algorithms included in guideway detection module 205 or object detection module 207 to be modified based on one or more of a user instruction received by way of communication module 217 or a machine learning algorithm included in update module 209. Mapping module 213 is configured to generate one or more of a map of a three dimensional space based on the processed point cloud data, a map of a guideway comprising the one or more portions of the guideway based on the processed point cloud data, or a map of the one or more objects associated with the guideway based on the point cloud data. In some embodiments, the one or more of the generated one or more maps are combined as layers by mapping module 213 to be included as an overall system map representing the guideway and the one or more objects associated with the guideway in a displayable form to be output by display module 215 in a format that is capable of being displayed by way of one or more of a graphical user interface, a textual report, or some other suitable format. In some embodiments, communication module 217 is configured to cause data to be received by management platform 203 for processing, to cause results generated by management platform 203 to be communicated to an entity external to management platform 203, or to facilitate communications among the modules included in management platform 203.

Figure 3:
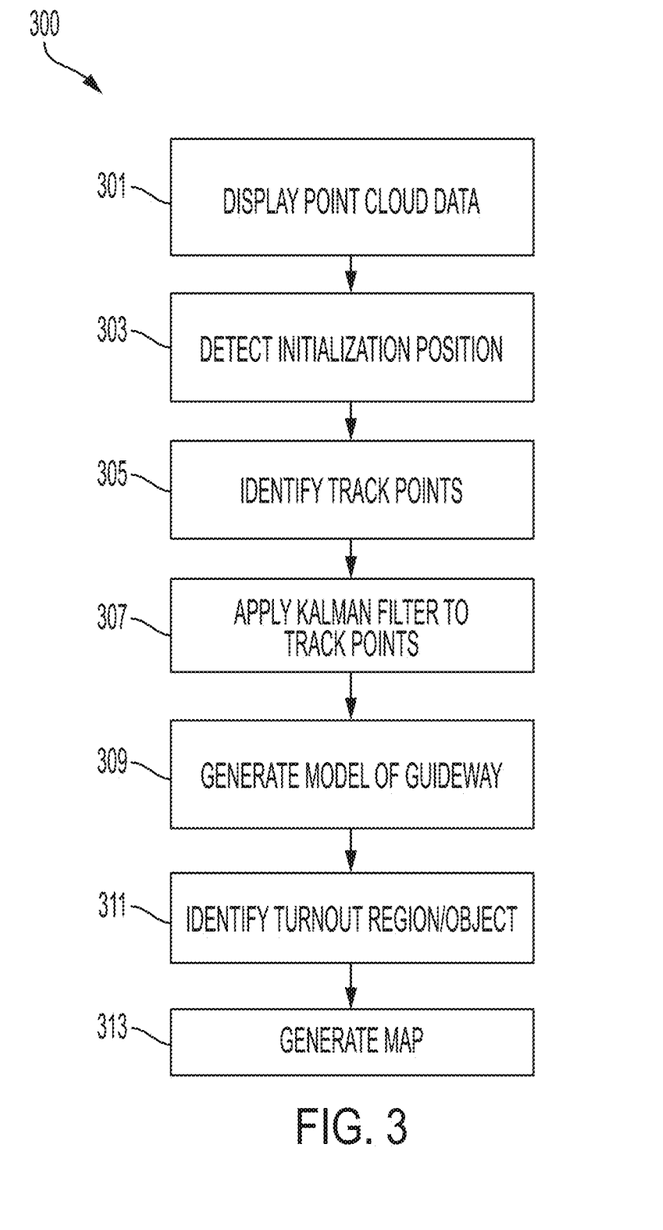
FIG. 3 is a flow chart of a method of extracting guideway assets from point cloud data and generating a map of the guideway and various objects associated with the guideway, in accordance with one or more embodiments.

FIG. 3 is a flow chart of a method 300 of extracting guideway assets from point cloud data and generating a map of the guideway and various objects associated with the guideway, in accordance with one or more embodiments. In some embodiments, method 300 is performed by at least one processor. In some embodiments, method 300 is performed by management platform 103 (FIG. 1).

In step 301, point cloud data generated based on a scanning of a three dimensional space is caused to be displayed by way of a graphical user interface. In some embodiments, the point cloud data is generated by a LIDAR scanning of the three dimensional space.

In step 303, an initialization position of a processing zone is detected within the graphical user interface. The processing zone has boundaries and a predefined direction extending away from the initialization position. In some embodiments, the processing zone is positioned in the graphical user interface based on a user input. In some embodiments, the processing zone is positioned in the graphical user interface automatically by management platform 103. In some embodiments, the processing zone comprises a pair of processing windows, the guideway comprises two rails, and each window of the pair of windows is positioned over one of the rails of the pair of rails. In some embodiments, at least one of the processing windows of the pair of processing windows has a predefined default shape and size. In some embodiments, the processing windows of the pair of processing windows have a matching shape and size. In some embodiments, at least one processing window of the pair of processing windows has a selectable shape and size. In some embodiments, one processing window of the pair of processing windows has a shape and size based on the other processing window included in the pair of processing windows. In some embodiments, each processing window is rectangular. In some embodiments, one or more of the processing windows included in the pair of processing windows is some other suitable shape.

In step 305, a plurality of points within the processing zone are identified as track points.

In step 307, a Kalman filter is applied to the track points to identify a trajectory of a guideway in the three dimensional space based on the initialization position and the predefined direction.

In step 309, a model of the guideway is generated based on the track points and the identified trajectory. In some embodiments, generating the model of the guideway comprises processing the track points up to a detected turnout region or a detected object associated with a turnout region, identifying a first branch of the guideway and a second branch of the guideway based on the detected turnout region or the detected object associated with a turnout region, generating a first portion of the model of the guideway based on the track points and the trajectory of one of the first branch of the guideway or the second branch of the guideway, and subsequently generating a second portion of the model of the guideway based on the track points and the trajectory of the other of the first branch of the guideway or the second branch of the guideway. In some embodiments, an entirety of the model of the guideway is generated before detecting one or more objects.

In step 311, one or more of (1) a turnout region is detected in the model of the guideway based on a comparison of the track points with one or more turn out templates stored in a database, or (2) an object associated with the guideway is detected based on a comparison of the point cloud data with one or more object templates stored in the database. Each of the one or more turn out templates is representative of one or more shapes associated with one or more known turn out regions. Each of the one or more object templates is representative of one or more shapes associated with one or more known objects. In some embodiments, the object associated with the guideway comprises one or more of a platform, a signal, a sign, a switch, or a tunnel. In some embodiments, the object associated with the guideway comprises one or more ends of a switch track. In some embodiments, an end of a switch track is a toe point.

In some embodiments, one or more of the turnout region or the object associated with the guideway is detected along the guideway by applying machine learning to the point cloud data and the templates to identify the turnout region or the object to pattern match possible objects in the point cloud data.

In step 313, a map is generated. The map comprises the model of the guideway and one or more of the turnout region or the object, and at least one label. In some embodiments, generating the map includes generating multiple layers comprising a first layer including the model of the guideway and a second layer comprising the at least one label. In some embodiments, the first layer and the second layer are caused to be displayed simultaneously. In some embodiments, the first layer and the second layer are overlapping when displayed simultaneously. In some embodiments, the first layer and the second layer are displayed side-by-side when displayed simultaneously. In some embodiments, a selected one of the first layer or the second layer is caused to be displayed and a non-selected one of the first layer or the second layer is deactivated such that the non-selected layer is caused to be hidden from being displayed.

In some embodiments, step 313 includes drawing a centerline along the model of the guideway, a distance between the object associated with the guideway and the centerline is calculated, a distance between the initialization position and the object associated with the guideway along the centerline is calculated, the calculated distances are stored in a database, and a guideway topology report is generated comprising one or more edges or nodes associated with the object associated with the guideway and distances corresponding to each of the one or more edges or nodes stored in the database.

In some embodiments, step 313 includes calculating a height of the object associated with the guideway based on the point cloud data, wherein the height is determined with respect to one or more of the guideway, a reference position separate from the guideway, or a predefined reference plane; and including the height of the object associated with the guideway in one or more of the guideway topology report or the map.

Figure 4:
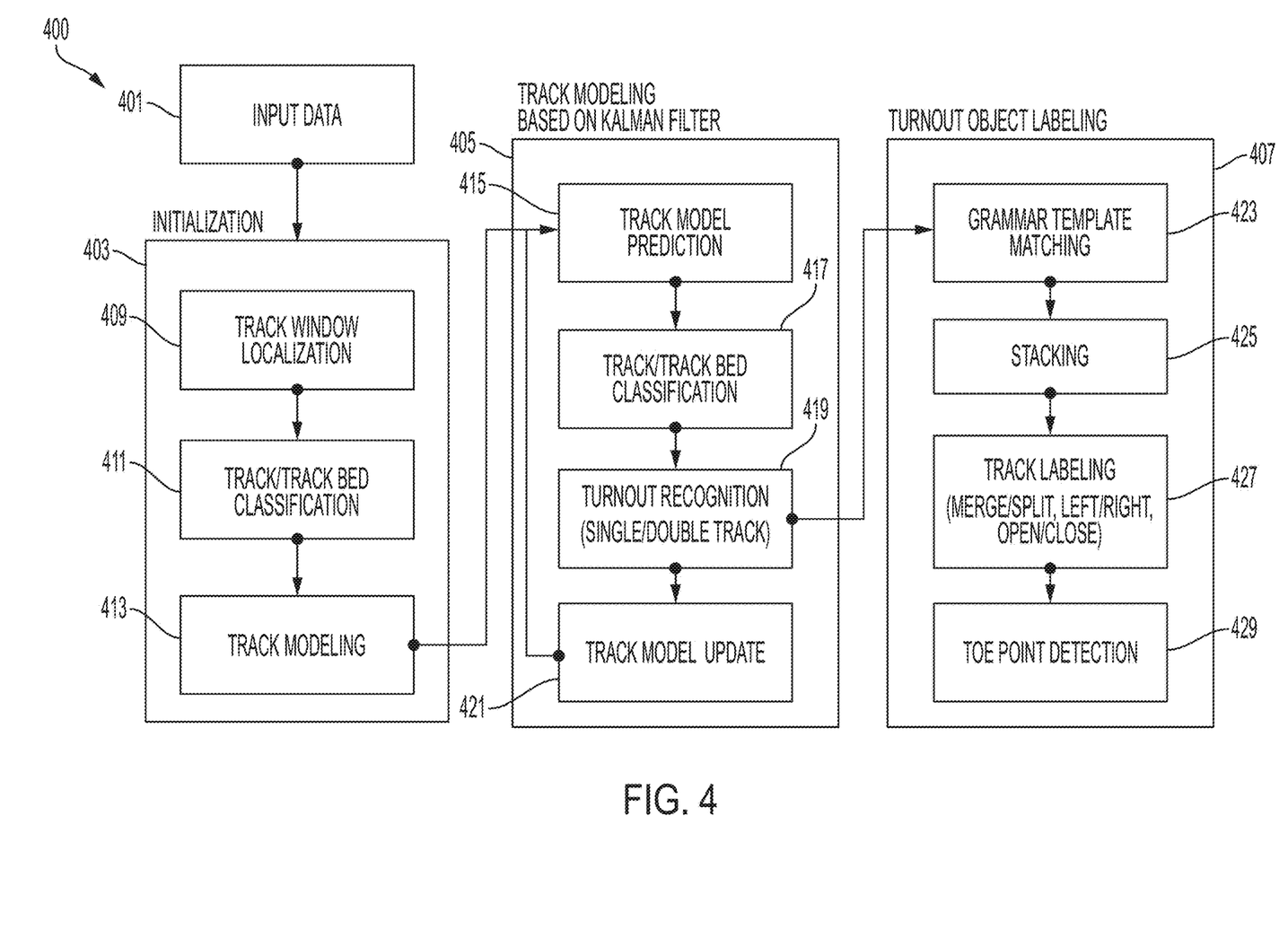
FIG. 4 is a flow chart of a method of extracting guideway assets from point cloud data and generating a map of the guideway and various objects associated with the guideway, in accordance with one or more embodiments.

FIG. 4 is a flow chart of a method 400 of extracting guideway assets from point cloud data and generating a map of the guideway and various objects associated with the guideway, in accordance with one or more embodiments.

In some embodiments, method 400 is performed by at least one processor. In some embodiments, method 400 is performed by management platform 103 (FIG. 1).

In step 401, point cloud data generated based on a scanning of a three dimensional space is recognized as input data that is to be processed.

In step 403, an initialization process is performed that outputs a rough model of a guideway included in the three dimensional space.

In step 405, a track modeling process is performed that outputs an updated model of the guideway and one or more turnout regions, objects associated with the guideway, track/bed types, or other suitable data is detected and output.

In step 407, the one or more turnout regions, objects, track/bed types or other suitable data is identified and labeled for inclusion in one or more of a map generated by method 400, a report generated by method 400, or to be stored in a database.

Step 403 includes step 409 in which a track window is positioned within a graphical user interface that displays the point cloud data and an initialization position of the track window is detected. In some embodiments, the track window has boundaries and a predefined direction extending away from the initialization position.

Step 403 includes step 411 in which a plurality of points within the track window are identified as track points. In some embodiments, identifying the points within the track window as track points comprises identifying track or track bed information indicative of a type of track or track bed with which the track points are predicted to be associated. In some embodiments, the type of track or track bed indicates that a guideway capable of being modeled based on the point cloud data is a monorail, a dual rail, a triple rail, or other suitable quantity of rails or descriptor regarding a form of a guideway, a location of the guideway, an indication of whether a portion of the guideway within the track window is straight, curved, has an incline, decline, or some other suitable descriptor associated with a property of the guideway.

Step 403 includes step 413 in which a rough model of a guideway in the three dimensional space is generated based on the track points. In some embodiments, the rough model of the guideway is further based on the track or track bed information.

Step 405 includes step 415 in which a Kalman filter is applied to the rough model of the guideway to identify a trajectory of consecutive guideway portions included in the guideway.

Step 405 includes step 417 in which the track or track bed information is one or more of confirmed or refined based on the trajectory of the consecutive guideway portions included in the guideway.

Step 405 includes step 419 in which a turnout region is detected in the model of the guideway based on one or more of the track points, the rough model of the guideway or the trajectory of the consecutive guideway portions with one or more turn out templates stored in a database. In some embodiments, a detected turnout region is recognized as being a single track turnout, a double track turnout, or some other suitable quantity of track turnout based on the point cloud data.

Step 405 includes step 421 in which an updated model of the guideway is generated by revising the rough model of the guideway based on the trajectory of the consecutive guideway portions and the turnout region.

Step 407 includes step 423 in which one or more of an object associated with the guideway is detected based on a comparison of the point cloud data with one or more object templates stored in the database, or a type of the turnout region is determined based on a comparison of the point cloud data with one or more turnout templates stored in the database. In some embodiments, the one or more object templates are representative of one or more shapes associated with one or more known objects. In some embodiments, the one or more turnout templates are representative of one or more shapes associated with one or more known turnout regions. In some embodiments, a detected turnout region is recognized as being a single track turnout, a double track turnout, or some other suitable quantity of track turnouts based on the comparison of the point cloud data to the one or more turnout templates.

Step 407 includes step 425 in which a map is generated that comprises the updated model of the guideway and one or more of the turnout region or the object, stacked, as selectable layers capable of being displayed and/or included in a system topology report that includes details describing the guideway, turnout regions and/or objects associated with the guideway.

Step 407 includes step 427 in which at least one of the turnout regions or the objects is labeled in one or more of the map or the system topology report. In some embodiments, a label describing the turnout region or the object is in a layer that includes the turnout region or the object, in a label layer, in a corresponding turnout label layer, in a corresponding object label layer, or other suitable layer included in the map or the system topology report, or included as part of the map or included as a part of the system topology report. In some embodiments, a generated label includes an indication of whether a position in the map is a track merge or split, a left branch or a right branch of a track, a left side or a right side of a branch based on a reference position and a direction away from the reference position, whether an identified object is opened or closed at a time the scan of the three dimensional space was performed, or other suitable information.

Step 407 includes step 429 in which toe points at a turnout region are identified. In some embodiments, the toe points are objects identified in the point cloud data. In some embodiments, the toe points are identified and labeled separately from the object identification or object labeling.

Figure 5:
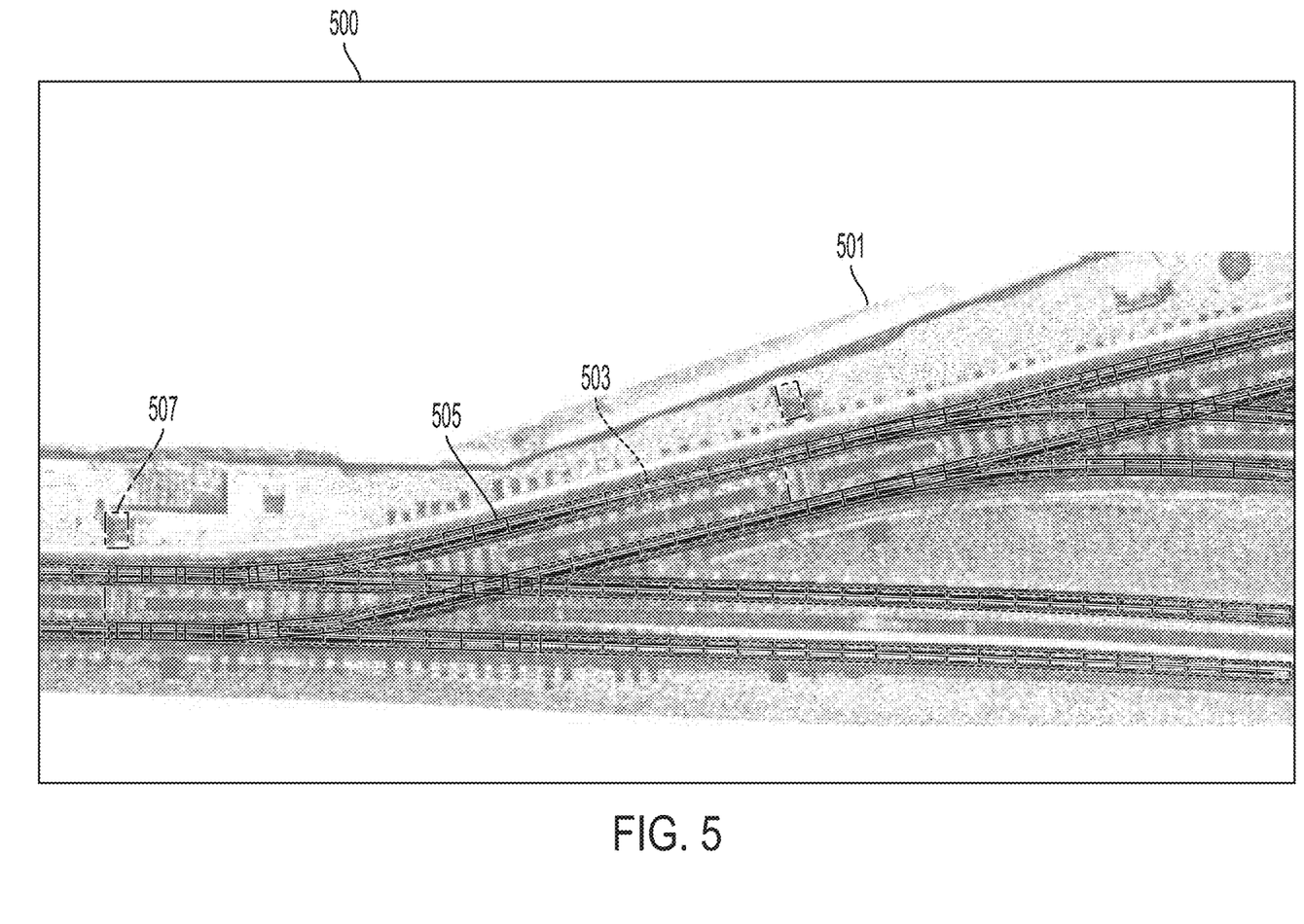
FIG. 5 is a diagram of a user interface, in accordance with one or more embodiments.

FIG. 5 is a diagram of a user interface 500, in accordance with one or more embodiments. User interface 500 is viewable by way of display 111 (FIG. 1). User interface 500 is configured to display rail track vectors for a turnout region, in accordance with some embodiments.

User interface 500 is a display of point cloud data 501 that has several processing zones 503 that are arranged consecutively over a plurality of areas included in the point cloud data 501. Turnout regions 505 are highlighted in user interface 500. Objects 507 are identified in user interface 500.

In some embodiments, in order to recognize multi-tracks, a model selection process is conducted by applying Minimum Description Length, and turnout region 505 and its type are recognized using template matching.

Figure 6A:
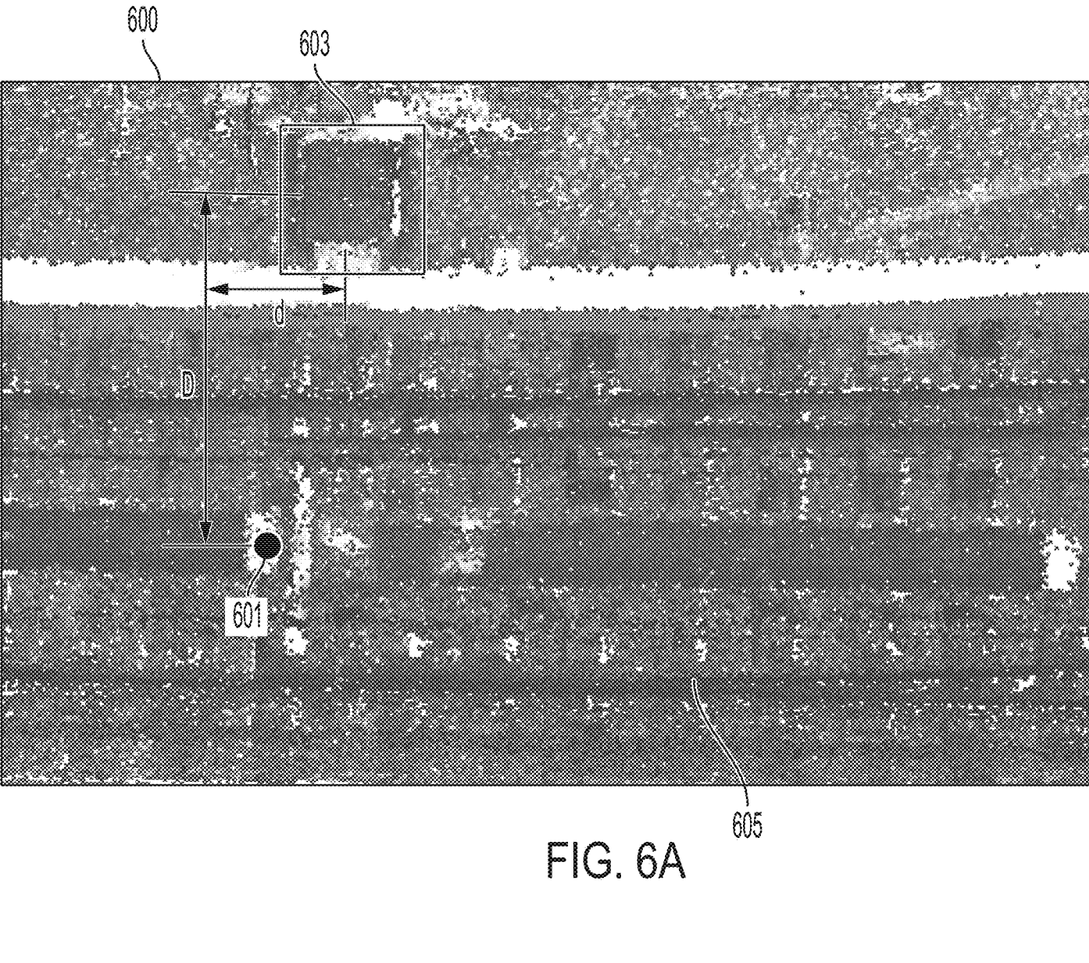
FIG. 6A is a diagram of a user interface, in accordance with one or more embodiments.
Figure 6B:
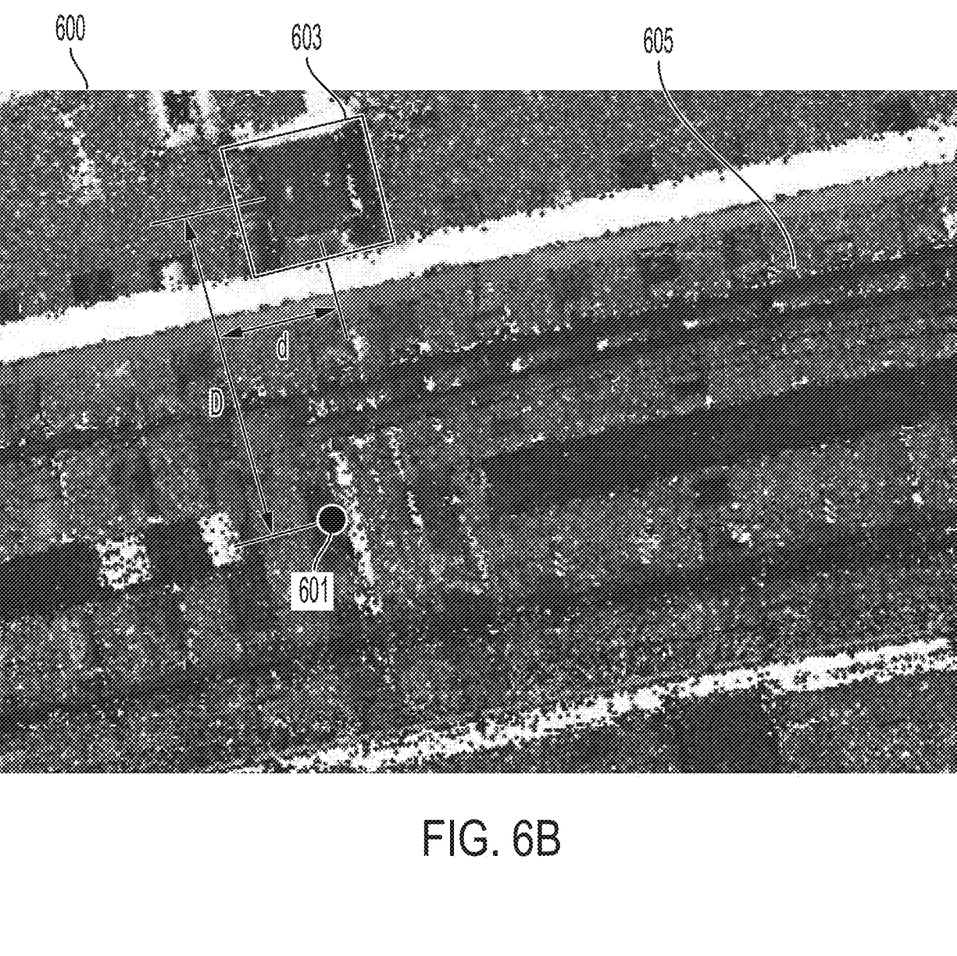
FIG. 6B is a diagram of a user interface, in accordance with one or more embodiments.

FIGS. 6A and 6B are diagrams of a user interface 600, in accordance with one or more embodiments. User interface 600 is viewable by way of display 111 (FIG. 1). User interface 600 is configured to display an image of a relation between a center of a pair of toes 601 and a switch box 603, in accordance with some embodiments.

FIG. 6A includes dimensions indicative of a distance between the center of the switch box 603 alongside a guideway 605. The point cloud data shown by user interface 600 in FIG. 6A is based on a reference vantage point and/or direction in an XYZ axis.

FIG. 6B includes dimensions indicative of the distance between the center of the switch box 603 alongside the guideway 605. The point cloud data shown by user interface 600 in FIG. 6B is based on a different reference vantage point and/or direction compared to the reference vantage point or direction in FIG. 6A in the XYZ axis.

In some embodiments, because the point cloud data is based on a scanning of a three dimensional space, the dimensions between various objects or rail assets may appear different based on the vantage reference point or direction when, in fact, the distance is the same. In some embodiments, the capability to rotate, change, or otherwise move a view of the point cloud data that is generated by scanning the three dimensional space makes it possible to detect additional railway assets based on the regularities observed in railway scene by, for example, matching known device 3D models to possible objects found on or along the guideway. In some embodiments, a machine learning algorithm is applied to pattern match possible objects in the point cloud data to templates stored in a database or with user acknowledged feedback.

Figure 7:
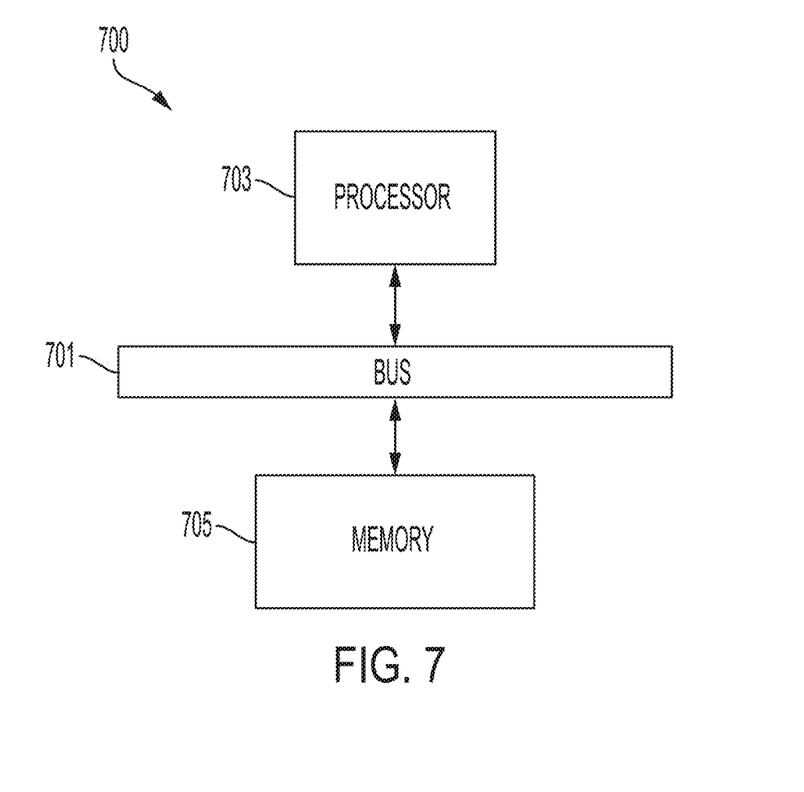
FIG. 7 is a functional block diagram of a computer or processor-based system upon which or by which some embodiments are implemented.

FIG. 7 is a functional block diagram of a computer or processor-based system 700 upon which or by which an embodiment is implemented.

Processor-based system 700 is programmed to extract guideway assets from point cloud data and generate a map of the guideway and various objects associated with the guideway, as described herein, and includes, for example, bus 701, processor 703, and memory 705 components.

In some embodiments, the processor-based system is implemented as a single "system on a chip." Processor-based system 700, or a portion thereof, constitutes a mechanism for performing one or more steps of extracting guideway assets from point cloud data and generating a map of the guideway and various objects associated with the guideway.

In some embodiments, the processor-based system 700 includes a communication mechanism such as bus 701 for transferring information and/or instructions among the components of the processor-based system 700. Processor 703 is connected to the bus 701 to obtain instructions for execution and process information stored in, for example, the memory 705. In some embodiments, the processor 703 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 703. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 703 performs a set of operations on information as specified by a set of instructions stored in memory 705 related to extracting guideway assets from point cloud data and generating a map of the guideway and various objects associated with the guideway. The execution of the instructions causes the processor to perform specified functions.

The processor 703 and accompanying components are connected to the memory 705 via the bus 701. The memory 705 includes one or more of dynamic memory (e.g., RAM, magnetic disk, writable optical disk, etc.) and static memory (e.g., ROM, CD-ROM, etc.) for storing executable instructions that when executed perform the steps described herein to extract guideway assets from point cloud data and generate a map of the guideway and various objects associated with the guideway. The memory 705 also stores the data associated with or generated by the execution of the steps.

In one or more embodiments, the memory 705, such as a random access memory (RAM) or any other dynamic storage device, stores information including processor instructions for extracting guideway assets from point cloud data and generating a map of the guideway and various objects associated with the guideway. Dynamic memory allows information stored therein to be changed by system 100. RAM allows a unit of information stored at a location called a memory address to be stored and retrieved independently of information at neighboring addresses. The memory 705 is also used by the processor 703 to store temporary values during execution of processor instructions. In various embodiments, the memory 705 is a read only memory (ROM) or any other static storage device coupled to the bus 701 for storing static information, including instructions, that is not changed by the system 100. Some memory is composed of volatile storage that loses the information stored thereon when power is lost. In some embodiments, the memory 705 is a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 703, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description relates to a method that comprises detecting an initialization position of a processing zone within a graphical user interface, the processing zone having boundaries and a predefined direction extending away from the initialization position, the graphical user interface comprising displayed point cloud data, the displayed point cloud data being based on a scanning of a three dimensional space. The method also comprises identifying a plurality of points within the processing zone as track points. The method further comprises applying a Kalman filter to the track points to identify a trajectory of a guideway in the three dimensional space based on the initialization position and the predefined direction. The method additionally comprises generating a model of the guideway based on the track points and the identified trajectory. The method also comprises detecting one or more of (1) a turnout region in the model of the guideway based on a comparison of the track points with one or more turn out templates stored in a database, the one or more turn out templates each being representative of one or more shapes associated with one or more known turn out regions, or (2) an object associated with the guideway based on a comparison of the point cloud data with one or more object templates stored in the database, the one or more object templates each being representative of one or more shapes associated with one or more known objects. The method further comprises generating a map comprising the model of the guideway and one or more of the turnout region or the object, and at least one label identifying the turnout region or the object included in the map.

Another aspect of this description relates to an apparatus comprising a processor and a memory having computer-executable instructions stored thereon that, when executed by the processor, cause the apparatus to detect an initialization position of a processing zone within a graphical user interface, the processing zone having boundaries and a predefined direction extending away from the initialization position, the graphical user interface comprising displayed point cloud data, the displayed point cloud data being based on a scanning of a three dimensional space. The apparatus is also caused to identify a plurality of points within the processing zone as track points. The apparatus is further caused to apply a Kalman filter to the track points to identify a trajectory of a guideway in the three dimensional space based on the initialization position and the predefined direction. The apparatus is additionally caused to generate a model of the guideway based on the track points and the identified trajectory. The apparatus is also caused to detect one or more of (1) a turnout region in the model of the guideway based on a comparison of the track points with one or more turn out templates stored in a database, the one or more turn out templates each being representative of one or more shapes associated with one or more known turn out regions, or (2) an object associated with the guideway based on a comparison of the point cloud data with one or more object templates stored in the database, the one or more object templates each being representative of one or more shapes associated with one or more known objects. The apparatus is further caused to generate a map comprising the model of the guideway and one or more of the turnout region or the object, and at least one label identifying the turnout region or the object included in the map.

A further aspect of this description relates to a method comprising detecting an initialization position of a processing zone within a graphical user interface, the processing zone having boundaries and a predefined direction extending away from the initialization position, the graphical user interface comprising displayed point cloud data, the displayed point cloud data being based on a scanning of a three dimensional space. The method also comprises identifying a plurality of points within the processing zone as track points. The method further comprises generating a rough model of a guideway in the three dimensional space based on the track points. The method additionally comprises applying a Kalman filter to the rough model of the guideway to identify a trajectory of consecutive guideway portions included in the guideway. The method also comprises detecting a turnout region in the model of the guideway based on one or more of the track points, the rough model of the guideway or the trajectory of the consecutive guideway portions with one or more turn out templates stored in a database. The method further comprises generating an updated model of the guideway by revising the rough model of the guideway based on the trajectory of the consecutive guideway portions and the turnout region. The method additionally comprises detecting an object associated with the guideway based on a comparison of the point cloud data with one or more object templates stored in the database, the one or more object templates each being representative of one or more shapes associated with one or more known objects. The method also comprises generating a map comprising the updated model of the guideway and one or more of the turnout region or the object, and at least one label identifying the turnout region or the object included in the map.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    detecting an initialization position of a processing zone within a graphical user interface, the processing zone having boundaries and a predefined direction extending away from the initialization position, the graphical user interface comprising displayed point cloud data, the displayed point cloud data being based on a scanning of a three dimensional space;
    identifying a plurality of points within the processing zone as track points;
    generating a rough model of a guideway in the three dimensional space based on the track points;
    applying a Kalman filter to the track points to identify a trajectory of the guideway in the three dimensional space based on the initialization position and the predefined direction;
    detecting a turnout region in the rough model of the guideway based on a comparison of the track points with one or more turn out templates stored in a database, the one or more turn out templates each being representative of one or more shapes associated with one or more known turn out regions;
    generating an updated model of the guideway by revising the rough model of the guideway based on the trajectory of the guideway and the turnout region; and
    generating a map comprising the updated model of the guideway and the turnout region, and at least one label identifying the turnout region included in the map.

2. The method of claim 1, wherein the point cloud data is generated by a LIDAR scanning of the three dimensional space.

3. The method of claim 1, wherein the processing zone comprises a pair of windows, the guideway comprises two rails, and each window of the pair of windows is positioned over one of the rails of the pair of rails.

4. The method of claim 1, further comprising:
    detecting an object associated with the guideway based on a comparison of the point cloud data with one or more object templates stored in the database, the one or more object templates each being representative of one or more shapes associated with one or more known objects;
    adding the object associated with the guideway to the updated model of the guideway,
    wherein the object associated with the guideway comprises one or more of a platform, a signal, a sign, a switch, or a tunnel.

5. The method of claim 4, wherein an entirety of the updated model of the guideway is generated before detecting the object associated with the guideway.

6. The method of claim 4, further comprising:
    drawing a centerline along the updated model of the guideway;
    calculating a distance between the object associated with the guideway and the centerline;
    calculating a distance between the initialization position and the object associated with the guideway along the centerline;
    storing the calculated distances in a database; and
    generating a guideway topology report comprising one or more edges or nodes associated the object associated with the guideway and distances corresponding to each of the one or more edges or nodes stored in the database.

7. The method of claim 6, further comprising:
    calculating a height of the object associated with the guideway based on the point cloud data, wherein the height is with respect to one or more of the guideway, a reference position separated from the guideway, or a predefined reference plane; and
    including the height of the object associated with the guideway in one or more of the guideway topology report or the map.

8. The method of claim 1, wherein generating the updated model of the guideway comprises:
    processing the track points up to a detected turnout region;
    identifying a first branch of the guideway and a second branch of the guideway based on the detected turnout region;
    generating a first portion of the updated model of the guideway based on the track points and the trajectory of one of the first branch of the guideway or the second branch of the guideway; and
    subsequently generating a second portion of the updated model of the guideway based on the track points and the trajectory of the other of the first branch of the guideway or the second branch of the guideway.

9. The method of claim 1, wherein generating the map includes generating multiple layers comprising a first layer including the updated model of the guideway and a second layer comprising the at least one label.

10. The method of claim 9, further comprising:
    causing the first layer and the second layer to be displayed simultaneously.

11. The method of claim 10, further comprising:
    causing a selected one of the first layer or the second layer to be displayed and deactivating a non-selected one of the first layer or the second layer to be hidden from being displayed.

12. The method of claim 1, wherein the turnout region is detected along the guideway by applying machine learning to the point cloud data and the templates to identify the turnout region in the point cloud data.

13. An apparatus, comprising:
a processor; and
a memory having computer-executable instructions stored thereon that, when executed by the processor, cause the apparatus to:
detect an initialization position of a processing zone within a graphical user interface, the processing zone having boundaries and a predefined direction extending away from the initialization position, the graphical user interface comprising displayed point cloud data, the displayed point cloud data being based on a scanning of a three dimensional space;
identify a plurality of points within the processing zone as track points;
generate a rough model of a guideway in the three dimensional space based on the track points;
apply a Kalman filter to the track points to identify a trajectory of the guideway in the three dimensional space based on the initialization position and the predefined direction;
detect a turnout region in the rough model of the guideway based on a comparison of the track points with one or more turn out templates stored in a database, the one or more turn out templates each being representative of one or more shapes associated with one or more known turn out regions;
generate an updated model of the guideway by revising the rough model of the guideway based on the trajectory of the guideway and the turnout region; and
generate a map comprising the updated model of the guideway and the turnout region, and at least one label identifying the turnout region included in the map.

14. The apparatus of claim 13, wherein the point cloud data is generated by a LIDAR scanning of the three dimensional space.

15. The apparatus of claim 13, wherein the processing zone comprises a pair of windows, the guideway comprises two rails, and each window of the pair of windows is positioned over one of the rails of the pair of rails.

16. The apparatus of claim 13, wherein the apparatus is further caused to:
detect an object associated with the guideway based on a comparison of the point cloud data with one or more object templates stored in the database, the one or more object templates each being representative of one or more shapes associated with one or more known objects; and
add the object associated with the guideway to the updated model of the guideway,
wherein the object associated with the guideway comprises one or more of a platform, a signal, a sign, a switch, or a tunnel.

17. The apparatus of claim 16, wherein the apparatus is caused to:
draw a centerline along the updated model of the guideway;
calculate a distance between the object associated with the guideway and the centerline;
calculate a distance between the initialization position and the object associated with the guideway along the centerline;
store the calculated distances in a database; and
generate a guideway topology report comprising one or more edges or nodes associated with the object associated with the guideway and distances corresponding to each of the one or more edges or nodes stored in the database.

18. The apparatus of claim 13, wherein the apparatus is caused to generate the updated model of the guideway by:
processing the track points up to a detected turnout region;
identifying a first branch of the guideway and a second branch of the guideway based on the detected turnout region;
generating a first portion of the updated model of the guideway based on the track points and the trajectory of one of the first branch of the guideway or the second branch of the guideway; and
subsequently generating a second portion of the updated model of the guideway based on the track points and the trajectory of the other of the first branch of the guideway or the second branch of the guideway.

19. The apparatus of claim 13, wherein the apparatus is caused to:
generate a first layer including the updated model of the guideway and a second layer comprising the at least one label for optional inclusion in a display of the map; and
based on a user input, cause the first layer and the second layer to be displayed simultaneously, or cause a selected one of the first layer or the second layer to be displayed and cause a non-selected one of the first layer or the second layer to be hidden from being displayed.

20. A method, comprising:
detecting an initialization position of a processing zone within a graphical user interface, the processing zone having boundaries and a predefined direction extending away from the initialization position, the graphical user interface comprising displayed point cloud data, the displayed point cloud data being based on a scanning of a three dimensional space;
identifying a plurality of points within the processing zone as track points;
generating a rough model of a guideway in the three dimensional space based on the track points;
applying a Kalman filter to the rough model of the guideway to identify a trajectory of consecutive guideway portions included in the guideway;
detecting a turnout region in the model of the guideway based on one or more of the track points, the rough model of the guideway or the trajectory of the consecutive guideway portions with one or more turn out templates stored in a database;
generating an updated model of the guideway by revising the rough model of the guideway based on the trajectory of the consecutive guideway portions and the turnout region;
detecting an object associated with the guideway based on a comparison of the point cloud data with one or more object templates stored in the database, the one or more object templates each being representative of one or more shapes associated with one or more known objects; and
generating a map comprising the updated model of the guideway and one or more of the turnout region or the object, and at least one label identifying the turnout region or the object included in the map.

* * * * *